United States Patent [19]

Akata et al.

[11] Patent Number: 5,594,724
[45] Date of Patent: Jan. 14, 1997

[54] TRANSMISSION CONVERGENCE SUBLAYER MULTIPLEX GENERATING/TERMINATING APPARATUS

[75] Inventors: Masao Akata; Takao Miura; Takeshi Ogawa, all of Tokyo; Yukihiro Doi; Isao Higashi, both of Saitama; Hitoshi Imagawa, Tokyo, all of Japan

[73] Assignees: NEC Corporation; Nippon Telegraph and Telephone Corporation, both of Tokyo, Japan

[21] Appl. No.: 522,555

[22] Filed: Sep. 1, 1995

[30] Foreign Application Priority Data

Sep. 2, 1994 [JP] Japan .................................. 6-209563

[51] Int. Cl.$^6$ ..................................................... M04L 12/66
[52] U.S. Cl. ........................................... 370/469; 370/395
[58] Field of Search ................................. 370/94.1, 94.2, 370/60, 60.1, 99, 102, 84, 79, 82, 110.1, 100.1, 112

[56] References Cited

U.S. PATENT DOCUMENTS

| | | | |
|---|---|---|---|
| 5,287,348 | 2/1994 | Schmidt et al. | 370/94.2 |
| 5,341,376 | 8/1994 | Yamashita | 370/99 |
| 5,428,609 | 6/1995 | Eng et al. | 370/99 |
| 5,483,527 | 1/1996 | Doshi et al. | 370/60.1 |

OTHER PUBLICATIONS

Tomonaga et al., "A Line Interface Structure for a Large Capacity ATM Switching System", *Technical Report of the IEICE* SSE94-1, pp. 1-6 (1994).

Primary Examiner—Douglas W. Olms
Assistant Examiner—Ajit Patel
Attorney, Agent, or Firm—Foley & Lardner

[57] ABSTRACT

A transmission convergence sublayer multiplex generating apparatus includes a TC layer calculating section, a TC layer information storing section for storing TC layer information in correspondence with each path, and an ATM layer information storing section for storing ATM layer information in correspondence with each path. The TC layer calculating section includes a section for, when receiving an ATM layer cell, storing the ATM layer cell in the ATM layer information storing section corresponding to a path number on the basis of header information of the ATM layer cell, and for, when receiving a TC layer information read request for each path through a control line, generating header error control information and scrambling the payload portion by time division multiplex processing using the ATM layer information of the corresponding path which is stored in the ATM layer information storing section to generate TC layer information, storing the TC layer information in the TC layer information storing section of the corresponding path, and outputting the TC layer information of the corresponding path to the TC layer information output line. A transmission convergence sublayer multiplex terminating apparatus is also disclosed.

2 Claims, 6 Drawing Sheets

TRANSMISSION CONVERGENCE SUBLAYER MULTIPLEX GENERATING/TERMINATING APPARATUS

BACKGROUND OF THE INVENTION

The present invention relates to a transmission convergence sublayer multiplex generating/terminating apparatus and, more particularly, to an ATM switch accommodating a plurality of low-speed lines, an interface between an ATM switch and an SDH (Synchronous Digital Hierarchy) transmission equipment, and the like.

A conventional apparatus which accommodates an ATM layer information input line, generates ATM transmission convergence sublayers (to be referred to as TC layers hereinafter) for m VC11 paths, and generates an STM1 highway by STM-multiplexing the VC11 paths, will be described below with reference to FIG. 5.

FIG. 5 shows a conventional STM1 generating apparatus.

An STM1 generating apparatus 300 is constituted by an SDH generating section 310, TC layer generating sections 320-i (1≦i≦m), and an ATM layer distributing section 330. The TC layer generating sections 320-i are respectively constituted by TC layer information registers 322-i, and ATM layer information registers 323-i.

An ATM layer information input line ATMin is connected to the ATM layer distributing section 330. The ATM layer distributing section 330 is connected to data input lines Di-i. The data input lines Di-i are respectively connected to the TC layer calculating sections 321-i of corresponding numbers i. The TC layer calculating sections 321-i are respectively connected to data output lines Do-i and control lines C-i of the corresponding numbers i. The data output lines Do-i and the control lines C-i are connected to the SDH generating section 310. The SDH generating section 310 is connected to an STM1 highway output line STM1out.

The ATM layer distributing section 330 analyzes the multiplex identifiers of ATM cells received from the ATM layer information input line ATMin, and distributes the respective cells to the data input lines Di-i corresponding to the path numbers. The TC layer generating sections 320-i store the ATM cells, which have been received through the data input lines Di-i of the corresponding numbers i, in the ATM layer information registers 323-i. If there is an empty space in a given TC layer information register 322-i, the corresponding TC layer generating section 320-i generates TC layer information by using the ATM layer information at the head of the corresponding ATM layer information register 323-i, and stores the TC layer information in the TC layer information register 322-i. Upon detection of a TC layer information output request from the SDH generating section 310 to a given control line C-i, the corresponding TC layer generating section 320-i outputs the TC layer information extracted from the corresponding TC layer information register 322-i to the corresponding data output line Do-i.

The SDH generating section 310 outputs a TC layer information output request to each control line C-i in accordance with the time position information of each path on an SDH frame, maps the pieces of TC layer information of the respective paths which have been received through the respective data output lines Do-i onto an SDH path, and outputs the mapped data to the STM1 highway output line STM1out.

A conventional apparatus which accommodates an STM1 highway obtained by STM-multiplexing m VC11 paths onto which ATM cells are mapped, and terminates the TC layers of the respective VC11 paths will be described next with reference to FIG. 6.

FIG. 6 shows a conventional TC layer terminating apparatus.

A TC layer terminating apparatus 400 is constituted by an SDH terminating section 410 and TC layer terminating sections 420-i (1≦i≦m). The TC layer terminating sections 420-i are respectively constituted by TC layer calculating sections 421-i and TC layer information registers 422-i.

An STM1 highway input line STM1in is connected to the SDH terminating section 410. The SDH terminating section 410 is connected to data input lines Di-i and control input lines Ci-i. The data input lines Di-i and the control input lines Ci-i are respectively connected to the TC layer calculating sections 421-i of corresponding numbers i. The TC layer calculating sections 421-i are respectively connected to data output lines Do-i and control output lines Co-i of the corresponding numbers i.

The SDH terminating section 410 terminates each VC11 path of the STM1 highway input line STM1in. The SDH terminating section 410 then outputs the CT layer information extracted from each VC11 path to the data input line Di-i corresponding to each path number in units of bytes, and indicates through the corresponding control input line Ci-i that the output information is valid. Each TC layer information register 422-i holds the latest TC layer information of the path, which has been received from the SDH terminating section 4101, by five bytes in the order of arrival.

As known well, cell synchronization as termination of a TC layer and a cell scrambler can be calculated for each byte data. When a given TC layer calculating section 421-i detects a validity indication on the corresponding control input line Ci-i, the TC layer calculating section 421-i terminates the TC layer by using a total of 6-byte TC layer information, i.e., the TC layer information received through the corresponding data input line Di-i at the same timing as that of the detection and 5-byte TC layer information held in the corresponding TC layer information register 422-i, generates ATM layer information, and outputs it to the corresponding data output line Do-i. At the same time, the TC layer calculating section 421-i writes the received TC layer information in the TC layer information register 422-i to update its contents.

In the conventional techniques, since a TC layer is generated or terminated by a circuit arranged for each path of an STM highway, hardware for generating or terminating TC layers is required by the amount corresponding to the number of paths. If a large number of paths on the STM highway are to be accommodated, the hardware amount becomes large.

SUMMARY OF THE INVENTION

It is an object of the present invention to reduce the hardware amount by causing a plurality of paths to share a circuit for generating or terminating a TC layer.

In order to achieve the above object, according to the present invention, there is provided a transmission convergence sublayer multiplex generating apparatus which receives ATM layer cells through an ATM layer information input line, generates ATM transmission convergence sublayers (TC layers) for a plurality of paths, and receives a TC layer information output request on a control line to output TC layer information of a corresponding path to a TC layer information output line, comprising a TC layer calculating section, a TC layer information storing section for storing TC layer information in correspondence with each path, and an ATM layer information storing section for storing ATM layer information in correspondence with each path, wherein the TC layer calculating section includes means for, when receiving an ATM layer cell, storing the ATM layer cell in the ATM layer information storing section corresponding to a path number on the basis of header information of the ATM layer cell, and for, when receiving a TC layer information read request for each path through a control line, generating header error control information and scrambling the payload portion by time division multiplex processing using the ATM layer information of the corresponding path which is stored in the ATM layer information storing section to generate TC layer information, storing the TC layer information in the TC layer information storing section of the corresponding path, and outputting the TC layer information of the corresponding path to the TC layer information output line.

In the TC layer multiplex generating apparatus of the present invention, the respective paths share the TC layer calculating section for generating a TC layer, ATM layer information received through each path is stored in a register, and a TC layer is generated by time division multiplex processing, thereby greatly reducing the hardware amount.

As known well, cell synchronization as termination of a TC layer and a cell scrambler can be calculated for each byte data. Assume that the TC layer information of a given path is received by one byte. In this case, the TC layer can be terminated, and ATM layer information can be generated by using past 6-byte TC layer information including the received byte.

In consideration of this point, according to the TC layer multiplex terminating apparatus of the present invention, the respective paths share the TC layer calculating section for terminating a TC layer, TC layer information received through each path is stored in a register, and TC layer termination is performed by time division multiplex processing every time each byte of each path of the STM highway input line arrives, thereby greatly reducing the hardware amount.

DESCRIPTION OF THE PREFERRED EMBODIMENT

An apparatus according to an embodiment of the present invention will be described with reference to FIG. 1. This apparatus accommodates an ATM layer information input line, generates ATM transmission convergence sublayers (TC layers) corresponding to m VC11 paths, and generates an STM1 highway by STM-multiplexing the paths.

Figure 1:
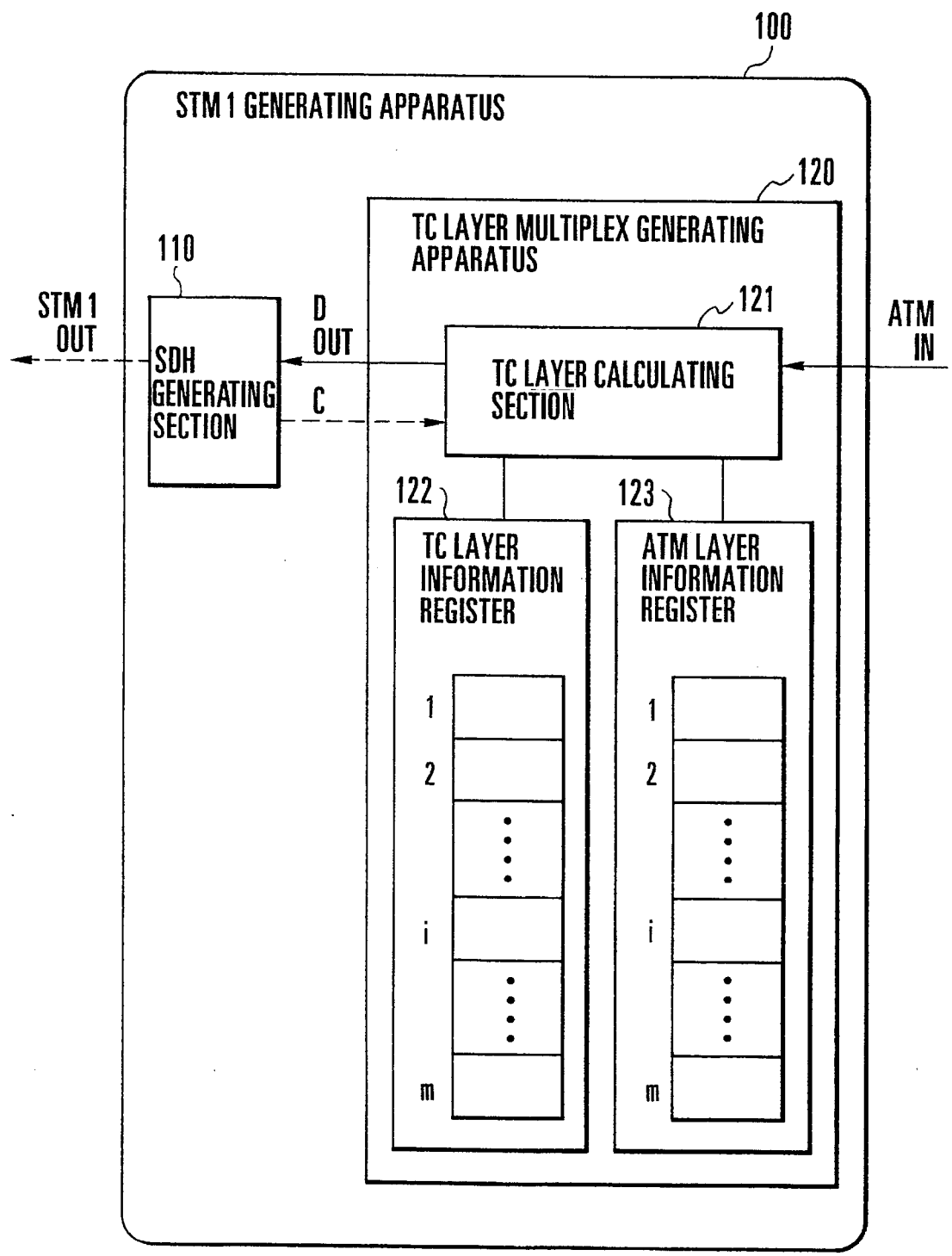
FIG. 1 is a block diagram showing the arrangement of an apparatus associated with a TC layer multiplex generating apparatus according to the present invention.

FIG. 1 shows the arrangement of an apparatus associated with a TC layer multiplex generating apparatus according to the present invention.

An STM1 generating apparatus 100 is constituted by an SDH generating section 110 and a TC layer multiplex generating apparatus 120. The TC layer multiplex generating apparatus 120 includes a TC layer calculating section 121, a TC layer information register 122, and an ATM layer information register 123.

An ATM layer information input line ATMin is connected to a TC layer calculating section 121. The TC layer calculating section 121 is connected to the TC layer information register 122, the ATM layer information register 123, a data output line Dout, and a control line C. The data output line Dout and the control line C are connected to the SDH generating section 110. The SDH generating section 110 is connected to an STM1 highway output line STM1out.

The TC layer calculating section 121 analyzes the multiplex identifiers of ATM cells received from the ATM layer information input line ATMin, and stores each cell in the ATM layer information register 123(i) corresponding to path number i. In addition, upon detection of an output request corresponding to the path number i through the control line C, the TC layer calculating section 121 generates and scrambles HEC by using the ATM layer information at the head of the corresponding ATM layer information register 123(i), thereby generating TC layer information. The TC layer calculating section 121 then stores the TC layer information in the TC layer information register 122(i), and outputs the TC layer information extracted from the TC layer information register 122(i) to the data output line Dout.

The SDH generating section 110 outputs the path number i for a TC layer information output request to the control line C in accordance with the time position information of each path on an SDH frame, maps the pieces of TC layer information of the respective paths, which have been received through the data output line Dout, onto an SDH path, and outputs the mapped information to the STM1 highway output line STM1out.

Figure 2:
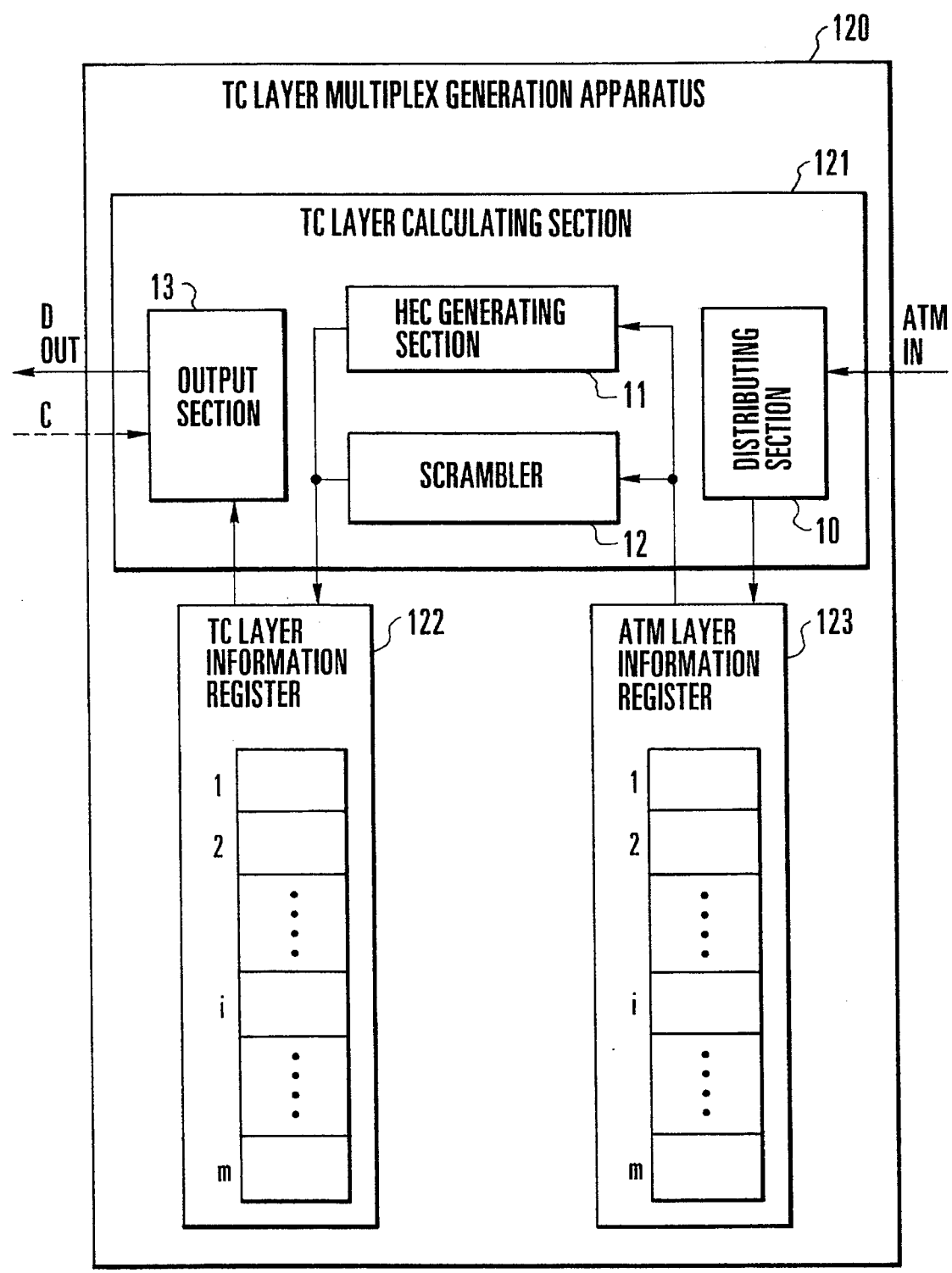
FIG. 2 is a block diagram showing the detailed arrangement of the TC layer multiplex generating apparatus in FIG. 1.

FIG. 2 shows the detailed arrangement of the TC layer multiplex generating apparatus 120 in FIG. 1.

As shown in FIG. 2, the TC layer calculating section 121 is constituted by a distributing section 10, an HEC generating section 11, a scrambler 12, and an output section 13. The distributing section 10 distributes ATM layer information according to path numbers, and manages the ATM layer information register 123. Upon reception of an ATM layer cell, the distributing section 10 stores the ATM layer information in the ATM layer information register 123 corresponding to the path number on the basis of the header information of the cell. The HEC generating section 11 extracts ATM layer information corresponding to a path number received through the control line C from the ATM layer information register 123, and generates header error control information (HEC) on the basis of the header information of the cell. The scrambler 12 scrambles the payload portion of the cell. The TC layer information generated by the HEC generating section 11 and the scrambler 12 is stored in the TC layer information register 122 corresponding to the path. The output section 13 reads out the TC layer information of the corresponding path from the TC layer information register 122 and outputs the information to the data output line Dout in response to a TC layer information output request received through the control line C. The HEC generating section 11 and the scrambler 12 perform time division multiplexing with respect to the respective paths.

An apparatus according to the embodiment of the present invention will be described next with reference to FIG. 3. This apparatus accommodates an STM1 highway obtained by STM-multiplexing m VC11 paths onto which ATM cells are mapped, and terminates the TC layer of each VC11 path.

Figure 3:
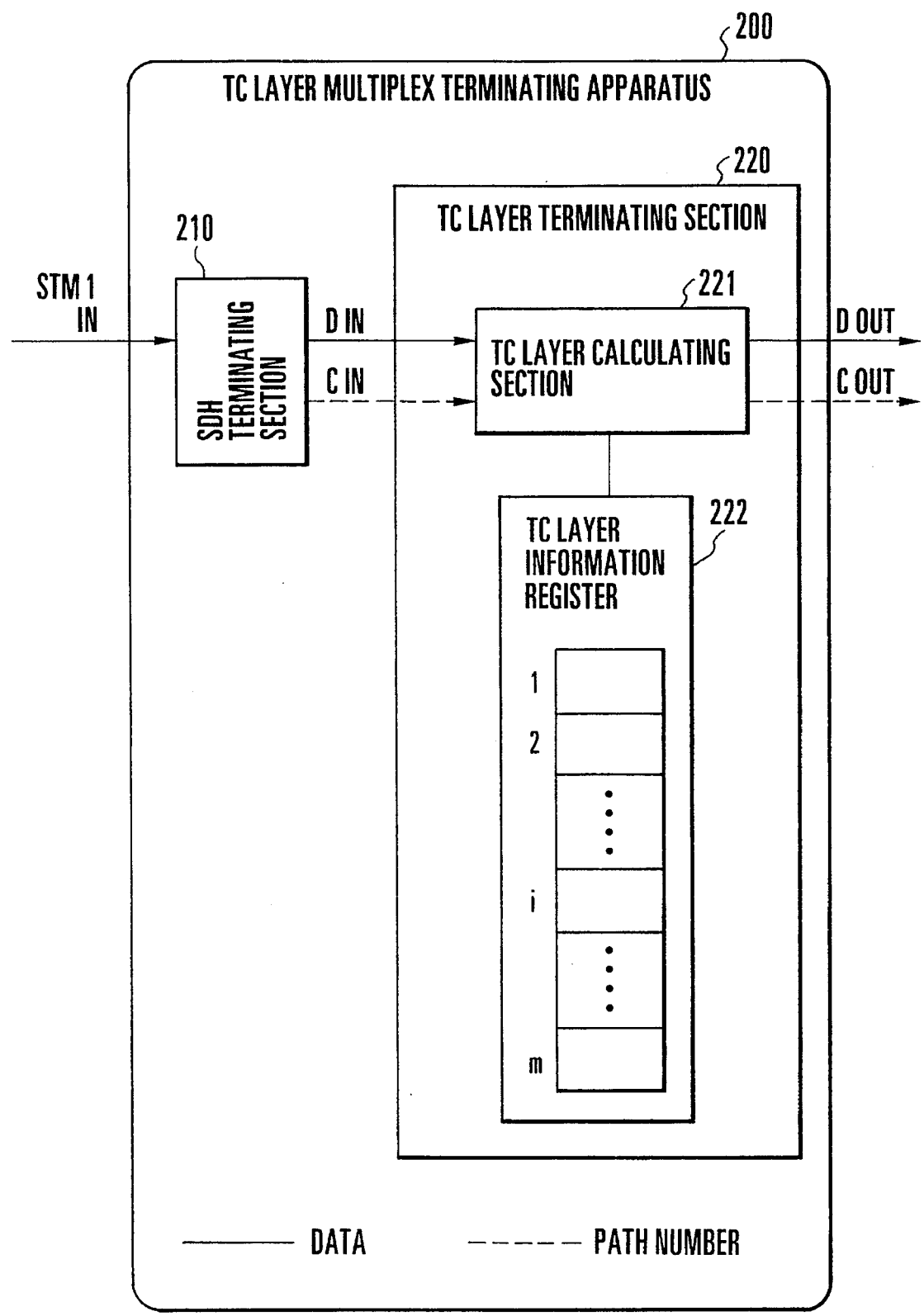
FIG. 3 is a block diagram showing the arrangement of a TC layer multiplex terminating apparatus according to the present invention.

FIG. 3 shows the arrangement of a TC layer multiplex terminating apparatus according to the present invention.

A TC layer multiplex terminating apparatus 200 is constituted by an SDH terminating section 210 and a TC layer terminating section 220. The TC layer terminating section 220 includes a TC layer calculating section 221 and a TC layer information register 222.

An STM1 highway input line STM1in is connected to the SDH terminating section 210. The SDH terminating section 210 is connected to a data input line Din and a control input line Cin. The data input line Din and the control input line Cin are connected to the TC layer calculating section 221. The TC layer calculating section 221 is connected to a data output line Dout and a control output line Cout.

The SDH terminating section 210 terminates each VC11 path of the STM1 highway input line STM1in, outputs TC layer information extracted from each VC11 path to the data input line Din in units of bytes, and outputs a corresponding path number i to the control input line Cin. The TC layer information register 222(i) holds the TC layer information of each path, which has been received from the SDH terminating section 210, by five bytes in the order of arrival.

As known well, cell synchronization as termination of a TC layer and a cell scrambler can be calculated for each byte data. Upon detection of a valid path number i through the control input line Cin, the TC layer calculating section 221 terminates the TC layer by using the TC layer information received through the data input line Din at the same timing as that of the detection and the 5-byte TC layer information of the corresponding path number and held in the TC layer information register 222(i), and outputs the ATM layer information to the data output line Dout. At the same time, the TC layer calculating section 221 writes the received TC layer information in the TC layer information register 222(i) to update its contents.

Figure 4:
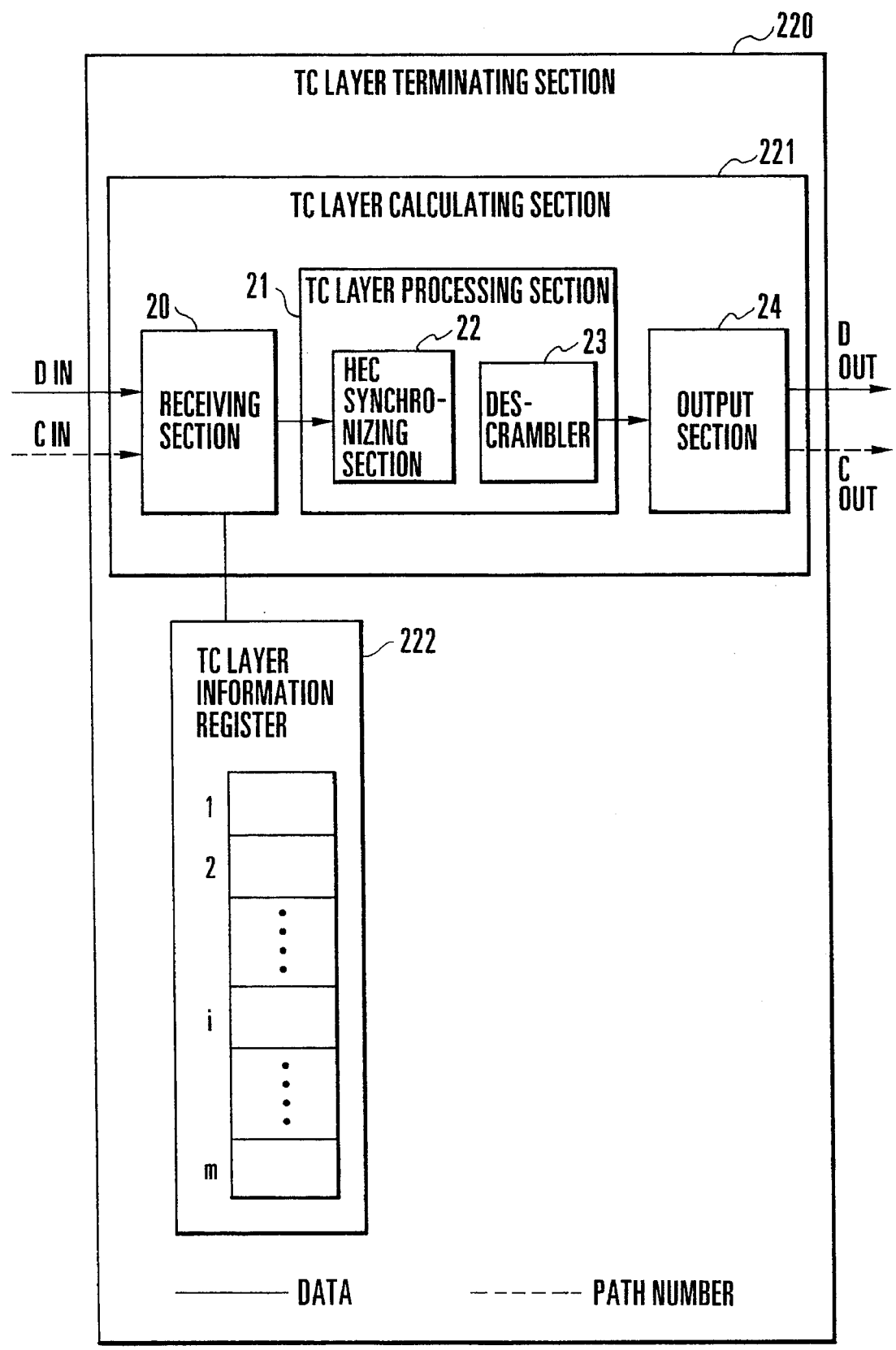
FIG. 4 is a block diagram showing the detailed arrangement of the TC layer terminating apparatus in FIG. 3.
Figure 5:
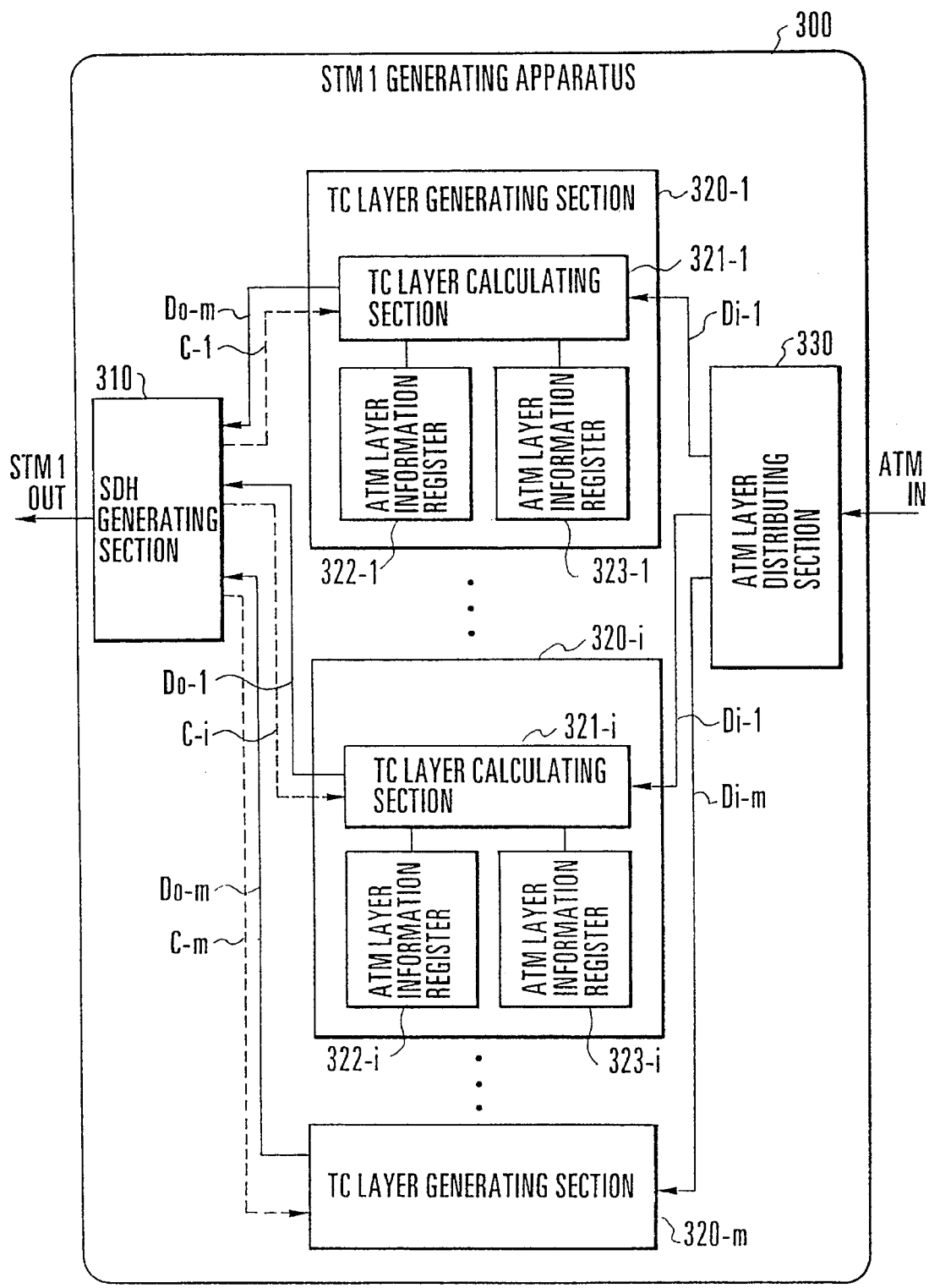
FIG. 5 is a block diagram showing a conventional STM1 generating apparatus.
Figure 6:
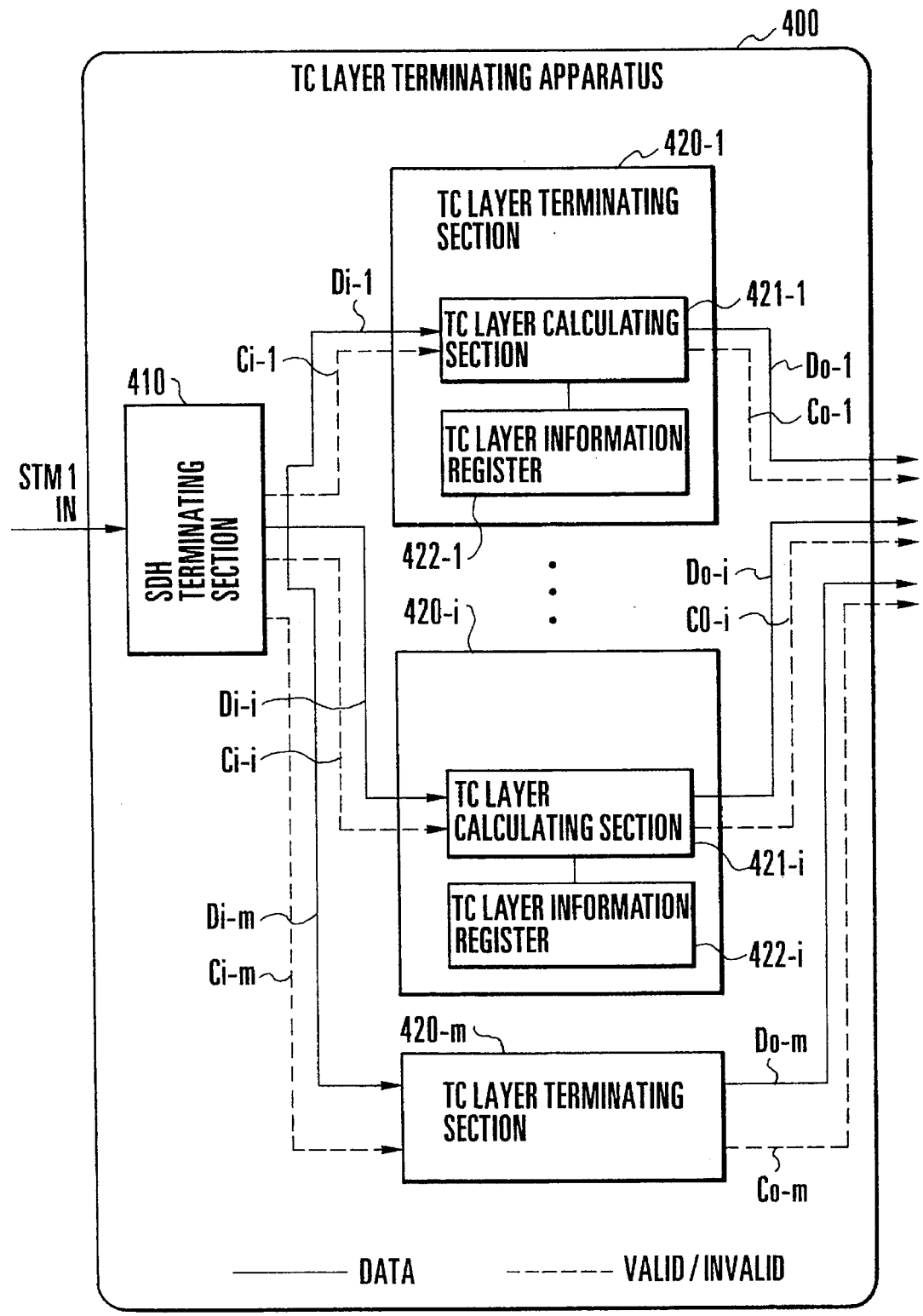
FIG. 6 is a block diagram showing a conventional TC layer terminating apparatus.

FIG. 4 shows the detailed arrangement of the TC layer terminating section 220 in FIG. 3. As shown in FIG. 4, the TC layer calculating section 221 is constituted by a receiving section 20, a TC layer processing section 21 having an HEC synchronizing section 22 and a descrambler 23, and an output section 24.

The receiving section 20 of the TC layer calculating section 221 receives data from the SDH terminating section 210 and manages the TC layer information register 222. Upon reception of a valid path number from the SDH terminating section 210 through the control input line Cin, the receiving section 20 sends, to the TC layer processing section 21, e.g., 1-byte TC layer information received through the data input line Din at the same timing as that of the path number and 5-byte TC layer information of the corresponding path number which is held in the TC layer information register 222. In addition, the receiving section 20 updates the contents of the TC layer information register 222 which correspond to the path so as to hold the latest 5-byte data of the path in the TC layer information register 222.

The TC layer processing section 21 performs HEC synchronization for header information through the HEC synchronizing section 22, and descrambles the payload portion through the descrambler 23. In this manner, ATM layer information is generated by the TC layer processing section 21 according to the time division multiplex scheme, and the generated ATM layer information is sent to the output section 24. The output section 24 performs format conversion to send the information to a device on the output side. For example, the output section 24 outputs a path number to the control output line Cout, and ATM layer information to the data output line Dout according to a predetermined format.

The embodiment of the present invention have exemplified the apparatus which accommodates the STM1 highway and terminates a TC layer. However, the present invention can be equally applied to an apparatus which accommodates an STM highway, e.g., a PDH highway, obtained by STM-multiplexing a plurality of paths, and terminates the ATM transmission convergence sublayer (TC layer) of each path.

By applying the present invention to an ATM switch accommodating a plurality of low-speed lines or an interface between an ATM switch and SDH transmission equipment, the hardware amount can be greatly reduced as compared with the conventional methods.

What is claimed is:

1. A transmission convergence sublayer multiplex generating apparatus which receives ATM layer cells through an ATM layer information input line, generates ATM transmission convergence sublayers (TC layers) for a plurality of paths, and receives a TC layer information output request on a control line to output TC layer information to a TC layer information output line, comprising:

a TC layer calculating section;

a TC layer information storing section for storing TC layer information in correspondence with each of said plurality of paths; and an ATM layer information storing section for storing ATM layer information in correspondence with each of said plurality of paths, wherein said TC layer calculating section includes means for, when receiving an ATM layer cell, storing the ATM layer cell in said ATM layer information storing section corresponding to a path number on the basis of header information of the ATM layer cell, and for, when receiving a TC layer information read request for one of said plurality of paths through said control line, generating header error control information and scrambling a payload portion of the ATM layer cell by time division multiplex processing using ATM layer information of a corresponding path which is stored in said ATM layer information storing section to generate TC layer information, storing the TC layer information in said TC layer information storing section of the corresponding path, and outputting the TC layer information of the corresponding path to the TC layer information output line.

2. A transmission convergence sublayer multiplex terminating apparatus which accommodates an STM highway obtained by STM-multiplexing a plurality of paths onto which ATM cells are mapped, and terminates an ATM transmission convergence sublayer (TC layer) of each of said plurality of paths, comprising:

an STM path terminating section; and a TC layer terminating section, wherein said TC layer terminating section includes a TC layer calculating section and a TC layer information storing section for storing TC layer information in correspondence with each of said plurality of paths, said STM path terminating section includes means for terminating the STM highway and outputting TC layer information extracted from each of said plurality of paths and a corresponding path number to said TC layer calculating section, and said TC layer calculating section includes means for holding TC layer information of each of said plurality of paths in said TC layer information storing section by a plurality of bytes in an order of arrival, terminating a TC layer by a time division multiplex scheme using TC layer information of said corresponding path number, generating ATM layer information, and updating said TC layer information storing section every time TC layer information of each of said plurality of paths is received.

* * * * *